(12) United States Patent
Raman et al.

(10) Patent No.: US 11,341,304 B2
(45) Date of Patent: May 24, 2022

(54) MACHINE LEARNING BASED METHODS AND APPARATUS FOR INTEGRATED CIRCUIT DESIGN DELAY CALCULATION AND VERIFICATION

(71) Applicant: Microchip Technology Inc., Chandler, AZ (US)

(72) Inventors: Madhusudan Raman, Santa Monica, CA (US); Nizar Abdallah, San Francisco, CA (US); Julien G. Dunoyer, Scarsdale, NY (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 17/111,218

(22) Filed: Dec. 3, 2020

(65) Prior Publication Data

US 2021/0173993 A1    Jun. 10, 2021

Related U.S. Application Data (60) Provisional application No. 62/946,352, filed on Dec. 10, 2019.

(51) Int. Cl.
| | | |
|---|---|---|
| *G06F 30/343* | (2020.01) | |
| *G06F 119/12* | (2020.01) | |
| *G06N 3/08* | (2006.01) | |

(52) U.S. Cl.
CPC ............. *G06F 30/343* (2020.01); *G06N 3/08* (2013.01); *G06F 2119/12* (2020.01)

(58) Field of Classification Search
USPC ....................................................... 716/108
See application file for complete search history.

(56) References Cited

U.S. PATENT DOCUMENTS

| 6,735,748 B1 | 5/2004 | Teig et al. |
|---|---|---|
| 6,857,112 B1 | 2/2005 | Teig et al. |

(Continued)

FOREIGN PATENT DOCUMENTS

| CN | 108629066 A | 10/2018 |
|---|---|---|
| JP | 3987255 B2 | 10/2007 |

OTHER PUBLICATIONS

Dai Steve et al., Fast and Accurate Estimation of Quality of Results in High-Level Synthesis with Machine Learning, 2018 IEEE 26th Annual International Symposium on Field-Programmable Custom Computing Machines (FCCM), IEEE, Apr. 29, 2018, pp. 129-132.

(Continued)

*Primary Examiner* — Bryce M Aisaka (74) *Attorney, Agent, or Firm* — Glass and Associates; Kenneth Glass (57) ABSTRACT

A method for integrated circuit design with delay verification includes storing configuration files for a slew-rate Machine Learning (ML) model, a net-delay ML model and a cell-delay ML model. A user design is received, slew-rate feature values, net-delay feature values and cell-delay feature values are extracted from the user design, the configuration files are loaded to form inference cores, and operations of the slew-rate inference core are performed to calculate predicted slew-rate values that are sent to ML design tools. Operations of the net-delay inference core are performed to calculate predicted net-delay values that are sent to the ML design tools. Operations of the cell-delay inference core are performed to generate predicted cell-delay values that are sent to the ML design tools. The user design is iterated until a user design is obtained that is free of timing violations.

17 Claims, 6 Drawing Sheets

(56) References Cited

U.S. PATENT DOCUMENTS

| | | |
|---|---|---|
| 6,883,148 B1 | 4/2005 | Teig et al. |
| 6,892,366 B1 | 5/2005 | Teig et al. |
| 7,051,293 B1 | 5/2006 | Teig et al. |
| 7,882,471 B1 * | 2/2011 | Kariat .................. G06F 30/367 |
| | | 716/113 |
| 2009/0013293 A1 | 1/2009 | Buehler et al. |
| 2019/0057174 A1 * | 2/2019 | Hashimoto ......... G06F 30/3312 |
| 2019/0121928 A1 | 4/2019 | Wu et al. |

OTHER PUBLICATIONS

PCT/US20/63215, International Search Report and Written Opinion of the International Searching Authority, European Patent Office, dated Mar. 15, 2021.

Seung-Soo Han et al: A deep learning methodology to proliferate golden signoff timing, Design, Automation, and Test in Europe Conference and Exhibition Proceedings, pp. 1-6, Mar. 1, 2014.

* cited by examiner

MACHINE LEARNING BASED METHODS AND APPARATUS FOR INTEGRATED CIRCUIT DESIGN DELAY CALCULATION AND VERIFICATION

REFERENCE TO RELATED APPLICATIONS

The present application claims priority to U.S. Provisional Patent Application Ser. No. 62/946,352, filed on Dec. 10, 2019, the contents of which are incorporated by reference herein in their entirety.

BACKGROUND

Performance evaluation capabilities in design tools allow designers to reach timing closure and to guarantee that a given design meets its performance requirements once implemented on the targeted silicon. This key capability requires design tools that have impact on the design performance to incorporate, in some cases highly accurate, delay calculation algorithms for each component, cell or IP, and for each net topology used in a design. At the same time, delay calculation increasingly presents significant challenges as technology evolves into smaller process technology nodes and, consequently, increases the complexity and variety of capabilities and features integrated into the same hardware architecture. In turn, this makes traditional delay calculation algorithms very difficult to tune, test, and guarantee accurate results.

Smaller technology nodes add to the number of parameters impacting signal propagation delays and require adjustments to existing ones. Examples of such new and/or modified parameters include On-Chip-Variation, IR-drop, Coupling Capacitance, relationship between signal transition delays and propagation delays, ratio between wire resistance and wire capacitance, and ratio of signal transitioning delays over the whole clock period.

Similarly, the increased complexity of modern System-On-Chip (SoC) architectures adds to the diversity of net topologies and contexts that design tools need to accurately process. Moreover, such complexity allows for much larger designs to be integrated into the same chip, leading to a significant increase in development time to tune traditional delay calculation algorithms (thereby impacting time-to-market of a product such as a Field Programmable Gate Array (FPGA)), as well as in run time experienced by designers when iterating on these algorithms to achieve timing closure.

Among the methods currently employed is an implementation of the moment matching analytical method, i.e., Asymptotic Waveform Evaluation (AWE), which is based on explicit moment matching to approximate the time-domain, or frequency-domain, circuit response in terms of a reduced order model. More recent implementations mostly employed in Application Specific Integrated Circuits (ASIC) design, such as Passive Reduced-order Interconnect Macro-modeling Algorithm (PRIMA) and Padé via Lanczos (PVL), use implicit moment matching based on Krylov subspaces. This method has long been considered quite accurate offering effective and stable solutions for many interconnect topologies, particularly in an FPGA context. However, it has recently been showing signs of weaknesses in terms of convergence and stability. The increasing complexity of FPGA interconnects with various component types adds to the challenge. While a first-order approximation, such as one described by Gupta, R., Tutuianu, B., Pileggi, L. T., "*The Elmore delay as a bound for RC trees with generalized input signals,*" IEEE Transactions on the Computer-Aided Design of Integrated Circuits and Systems, Volume: 16, Issue: 1, pp. 95-104 is probably stable, no such guarantee exists for higher order expansions. For most designs implemented in 28 nm SoC FPGAs, up to 20% of net delays fail with AWE 3rd order accuracy level and require reverting back to a 2nd order, which is less accurate. Another limitation of AWE is related to the inability of the reduced order model to guarantee passivity.

An alternative approach that has been used is to develop software friendly architectures; for example, making it a requirement for the architecture to be timing friendly. Under such approach, the architecture is heavily buffered with no intermediary taps on its routing tracks and, when possible, has balanced rise and fall timing characteristics. Such an architecture has a reasonably predictable timing, which allows the use of look-up tables populated with pre-simulated values using a highly accurate electrical simulator such as Simulation Program with Integrated Circuit Emphasis (SPICE). In this case, there is no need for any complex numerical solver to derive high quality timing information. However, this simplification comes at the expense of a more limited routing flexibility and, consequently, limits the maximum performance that can be achieved using such architectures.

Therefore, a modern delay calculation algorithm is needed which is highly accurate (i.e., within a few percent of SPICE) when compared to electrical simulation, easy to tune with deep sub-micron technologies, highly reliable, and faster to run by end-users than prior-art solutions.

BRIEF DESCRIPTION

In accordance with an aspect of the invention a method for integrated circuit (IC) design with delay verification is disclosed that includes storing configuration files of a slew-rate Machine Learning (ML) model, a net-delay ML model and a cell-delay ML model. A user design is received and feature values are extracted from the user design for each slew-rate feature, net-delay feature and cell-delay feature to obtain slew-rate feature values, net-delay feature values and cell-delay feature values. The slew-rate ML model configuration files are loaded to form a slew-rate inference core, operations of the slew-rate inference core are performed using the extracted slew-rate feature values as input to calculate predicted slew-rate values and the predicted slew-rate values are sent to design flow tools. The net-delay ML model configuration files are loaded to form a net-delay inference core, operations of the net-delay inference core are performed using the extracted net-delay feature values as input to calculate predicted net-delay values and the predicted net-delay values are sent to the design flow tools. The cell-delay ML model configuration files are loaded to form a cell-delay inference core, operations of the cell-delay inference core are performed using the extracted cell-delay feature values as input to calculate predicted cell-delay values and the predicted cell-delay values are sent to the design flow tools. The user design is iterated until a final user design is obtained that is free of timing violations.

An IC design system with delay verification is disclosed that includes data storage configured for storing configuration files for a slew-rate ML model, a net-delay ML model and a cell-delay ML model. A user-design feature extractor is coupled to the data storage and is configured to extract slew-rate feature values, net-delay feature values and cell-delay feature values from a user design. ML design flow tools are coupled to the user-design feature extractor and to the data storage. A prediction ML module is coupled to the data storage, the user-design feature extractor, and the ML design flow tools. The prediction ML module is configured to load the slew-rate ML model configuration files to form a slew-rate inference core, load the net-delay ML model configuration files to form a net-delay inference core and load the cell-delay ML model configuration files to form a cell-delay inference core. The prediction ML module is configured to perform operations of the slew-rate inference core using the extracted slew-rate feature values as input to calculate predicted slew-rate values, perform operations of the net-delay inference core using the extracted net-delay feature values as input to calculate predicted net-delay values and perform operations of the cell-delay inference core using the extracted cell-delay feature values as input to calculate predicted cell-delay values. The prediction ML module is configured to send the predicted slew-rate values, the predicted net-delay values and the predicted cell-delay values to design flow tools. The ML design flow tools are configured to iterate the user design until the user design is free of timing violations to identify a final user design.

The present invention offers several advantages over the prior art. The present invention has a faster run time potential during inference of the ML model as compared to many prior art methods/systems. The slow phase is the training which is executed only once for each product during the design of the tool (when the ML models are generated). The present invention is more reliable than many prior art methods/systems because it does not rely on human interpretation to achieve accurate modeling of active components and the method and apparatus of the present invention avoids the numerical limitations of an iterative solver that needs to be assessed for each product generation. In addition, the present invention is scalable to easily include new features impacting delay calculations.

BRIEF DESCRIPTION OF THE DRAWING FIGURES

The invention will be explained in more detail in the following with reference to embodiments and to the drawing figures in which are shown.

DETAILED DESCRIPTION

Persons of ordinary skill in the art will realize that the following description is illustrative only and not in any way limiting. Other embodiments will readily suggest themselves to such skilled persons.

Figure 1:
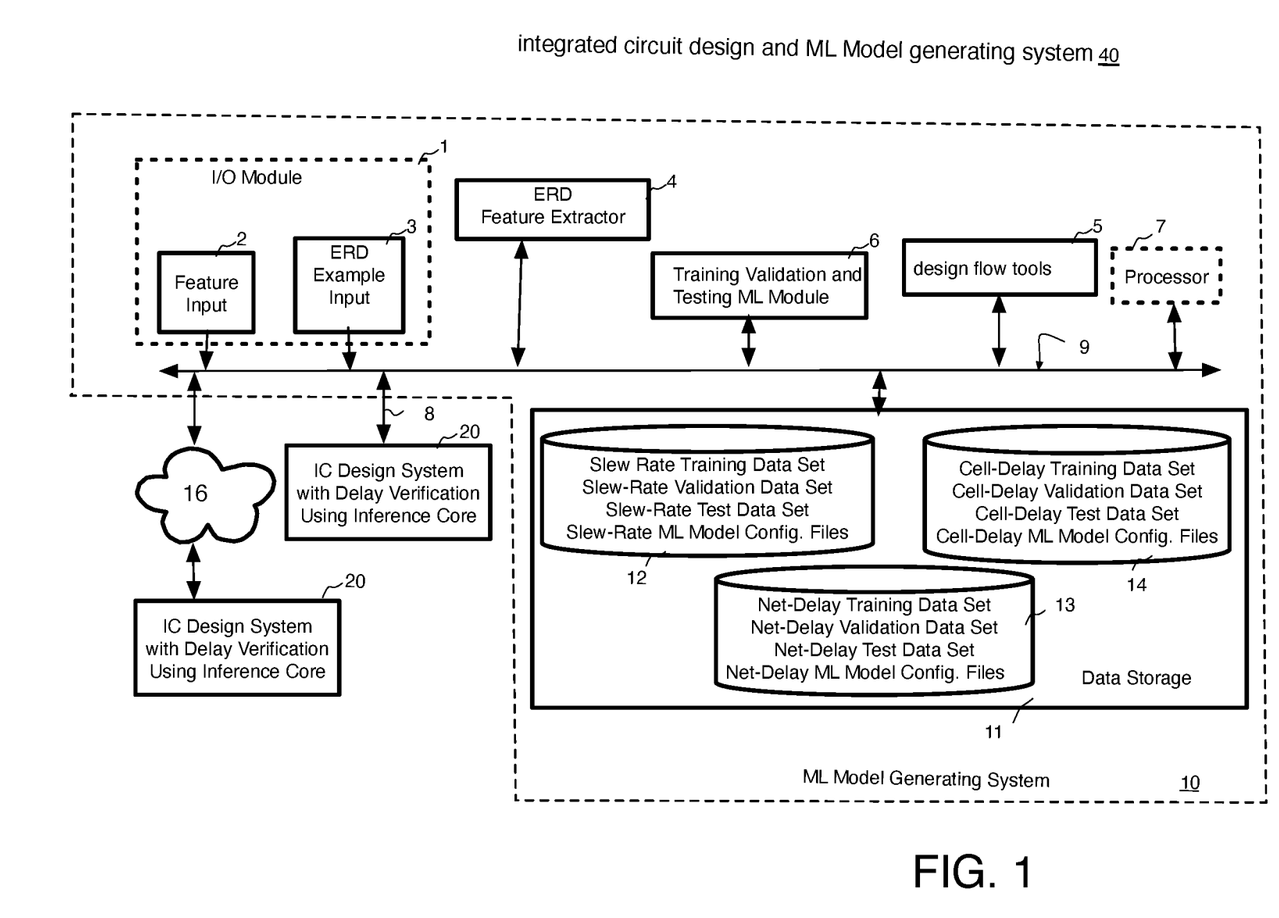
FIG. 1 is a block diagram of an IC design and ML Model generating system in accordance with an aspect of the present invention.

FIG. 1 shows an IC design and ML Model generating system 40, having an input and output (I/O) module 1 that includes one or more physical device for coupling input to IC design and ML Model generating system 40 and sending output from IC design and ML Model generating system 40. I/O module 1 includes feature input 2 and existing reference-design (ERD) example input 3. IC design and ML Model generating system 40 further includes an ERD feature extractor 4, design flow tools 5, training, validation and testing ML module 6, data storage 11 and one or more IC design system with delay verification using inference core 20, that may be referred to hereinafter simply as "IC design system" 20. Optionally IC design and ML Model generating system 40 includes a processor 7. I/O module 1, feature input 2, ERD example input 3, ERD feature extractor 4, training validation and testing ML module 6, design flow tools 5, data storage 11 and optional processor 7 are coupled together via a communication subsystem 9 (e.g., a system bus). I/O module 1, feature input 2, ERD example input 3, ERD feature extractor 4, training validation and testing ML module 6, design flow tools 5, data storage 11 and optional processor 7 form a ML model generating system 10 that may be, for example, disposed in a single computer housing, wherein each of ERD feature extractor 4, training validation and testing ML module 6, design flow tools 5 are respective software modules. In one example, ML module 6 is an ML software program such as the TensorFlow software program from Google, LLC of Mountain View, Calif. that is operable to generate, train validate, test and save an ML model.

Data storage 11 includes a slew-rate database 12, a net-delay database 13, a cell-delay database 14. In one example, each component of data storage 11, particularly slew-rate database 12, net-delay database 13 and cell-delay database 14, include one or more of Random-Access Memory (RAM), Read Only Memory (ROM), flash memory, hard disk drives and/or tape drives, or other data storage medium, as are known in the art. In some embodiments, data, programs, or other information may be stored remotely, for example in the "cloud."

Training, validation and testing ML module 6 includes software, firmware and/or hardware, and an ML framework for designing an ML model, and performing training, validation and testing of the ML model, then saving the ML model for later use by customers through circuit design tools. Given the features and the architecture of the model, the software for the actual generation of the model could use commercially available ML frameworks for ML model generation such as the TensorFlow software program mentioned above, or similar software programs and associated libraries as are known in the art.

In one example design flow tools 5 include at least one timing-driven tool such as a timing-driven place-and-route tool or a static timing analyzer tool. The actual delay of a given element represents what is called the true label. In one exemplary embodiment that will be used as an example in the following discussion of the invention, design flow tools 5 may include a SPICE deck constructor and a SPICE simulator, which may include one or more software program operable on optional processor 7. The operations of design flow tools 5 (e.g., the SPICE deck constructor and the SPICE simulator) are controlled by instructions from ERD feature extractor 4.

IC design system 20 may be located in the same physical facility as IC design delay verification ML model generating system 40, and couple directly to the other components of system 40 as shown by arrow 8. In one example, IC design system 20 is in a different location from ML model generating system 10 and is coupled to ML model generating system 10 via a communication system 16, which may be, for example, the Internet and that may include one or more optical, wireless or wired communication system as is commonly known in the art.

In one example, IC design system 20 is configured for downloading slew-rate ML model configuration files 34, net-delay ML model configuration files 35 and cell-delay ML model configuration files 36 and one or more software program comprising user-defined feature extractor 31, ML design flow tools 32 and prediction ML module 33 (see FIG. 2) from ML model generating system 10 and is configured to then perform design, validation and optionally programming and fabrication of IC devices independently of ML model generating system 10.

Figure 2:
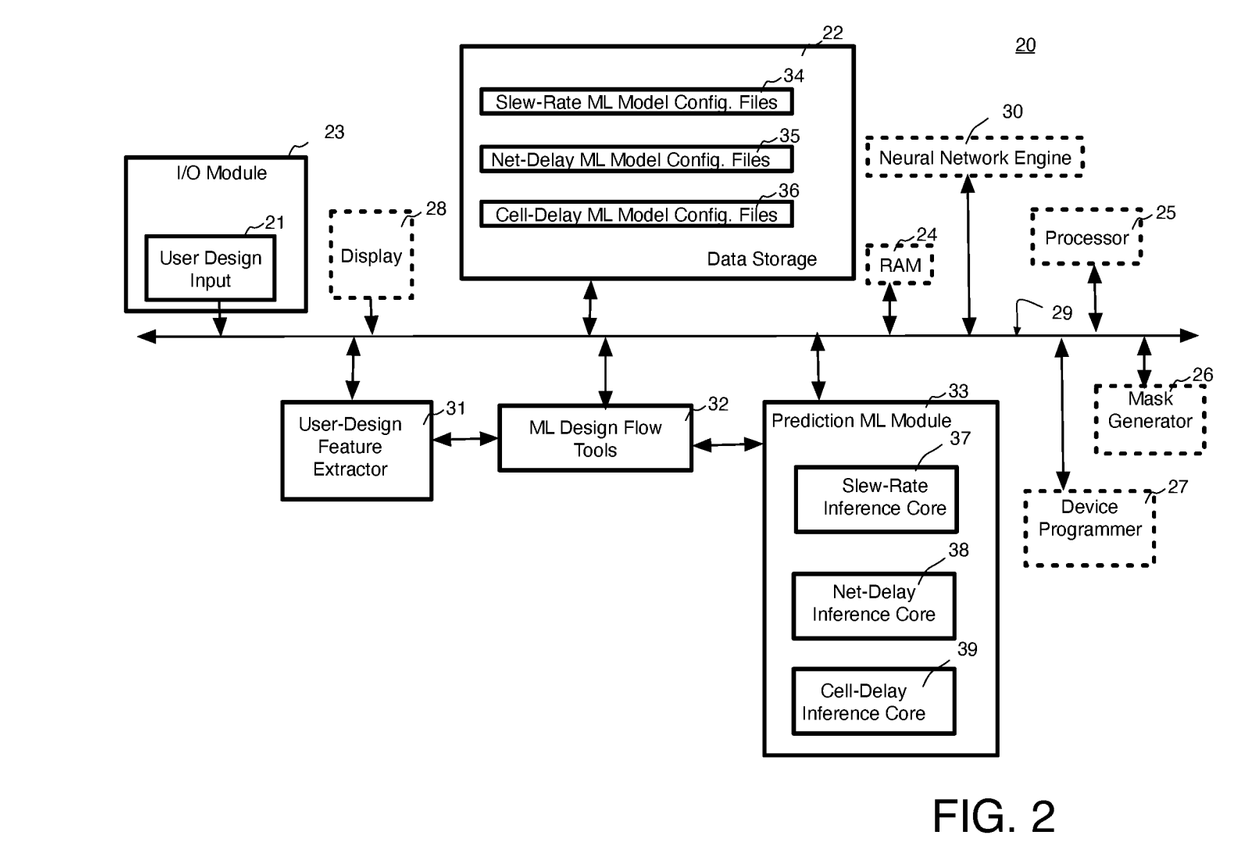
FIG. 2 is a block diagram of an IC design system with delay verification using an inference core in accordance with an aspect of the present invention.

IC design system 20 of FIG. 2 includes input and output (I/O) module 23 that includes one or more physical device for coupling input and sending output from IC design system 20. I/O module 32 includes user design input 21. IC design system 20 also includes data storage 22, a user-design feature extractor 31, ML design flow tools 32, and prediction ML module 33.

Slew-rate ML model configuration files 34, net-delay ML model configuration files 35 and cell-delay ML model configuration files 36 are stored in data storage 22. In one example, data storage 22 includes one or more of Random-Access Memory (RAM), Read Only Memory (ROM), flash memory, hard disk drives and/or tape drives, or other data storage medium, as are known in the art. In some embodiments, data, programs, or other information may be stored remotely, for example in the "cloud."

User-design feature extractor 31 includes one or more deck or file indicating corresponding net topology of the input user design (i.e., the manner in which the components are connected together) such that it is operable to extract feature values from the user design.

In one example, prediction ML module 33 includes ML components required for performing ML operations and does not include ML software, firmware and/or hardware components for generating an ML model. In this example, because timing is determined using ML models, ML design flow tools 32 will not include comprehensive modeling software such as SPICE (or other computationally intensive IC design tool programs as are commonly used in prior art design systems) such as may be included in design flow tools 5 of FIG. 1.

IC design system 20 optionally includes a specialized hardware module (e.g., a specialized configurable accelerator formed on a FPGA, or a dedicated ASIC) specifically configured to perform a neural network operation, and the specialized hardware module may also be referred to hereinafter as a "neural network engine" 30. IC design system 20 also optionally includes one or more display 28, Random Access Memory (RAM) 24, processor 25, mask generator 26 and device programmer 27.

I/O module 23, user-design input 21, user design feature extractor 31, ML design flow tools 32, prediction ML module 33, optional neural network engine 30, optional RAM 24, optional display 28, optional processor 25, optional mask generator 26 and optional device programmer 27 are coupled together via a communication subsystem 29 which may be, for example, a system bus. In one embodiment, each of user design feature extractor 31, ML design flow tools 32, prediction ML module are respective software modules, whose machine-readable instructions are stored on data storage 22, and run on optional processor 25.

Figure 3:
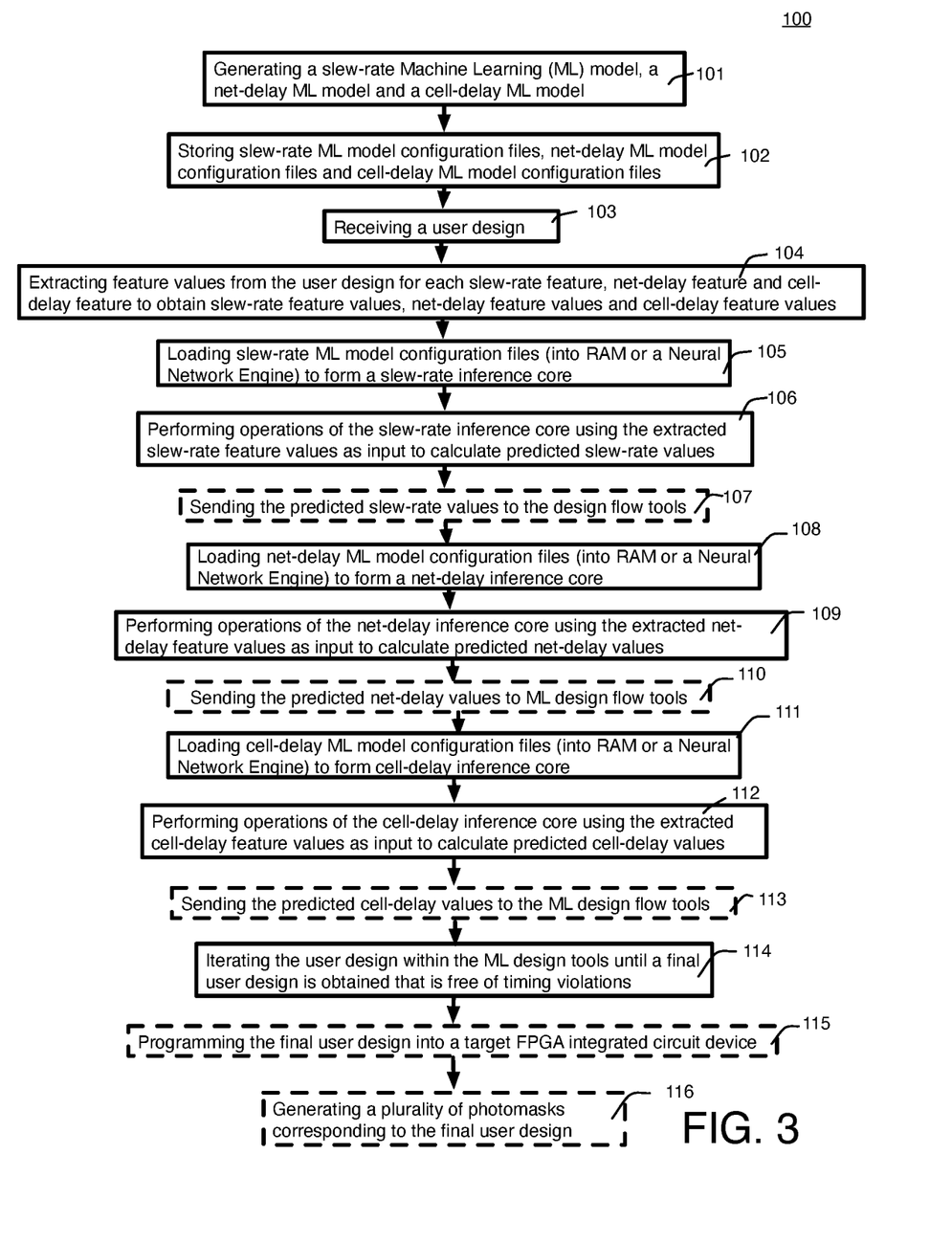
FIG. 3 is a flow diagram showing a method for IC design with delay verification in accordance with an aspect of the present invention.

FIG. 3 illustrates a method 100 for IC design with delay verification that incudes generating (101) a slew-rate ML model, a net-delay ML model and a cell-delay ML model. The slew-rate ML model is a predictor in which all parameters are computed that predicts slew-rate (slew-rate values). The net-delay ML model is a predictor in which all parameters are computed to predict net-delay (net-delay values). The cell-delay ML model is a predictor in which all parameters are computed to predict cell-delay (cell-delay values).

Slew-rate ML model configuration files, net-delay ML model configuration files and cell-delay ML model configuration files are stored (102). The slew-rate ML model configuration files include the architecture of the slew-rate ML model along with the parameters developed from the training of the slew-rate ML model, to be described further below, and may be stored in slew-rate database 12 of FIG. 1 and in data storage 22 of FIG. 2 as slew-rate ML model configuration files 34. The net-delay ML model configuration files include the architecture of the net-delay ML model along with the parameters developed from the training of the net-delay ML model and may be stored in net-delay database 13 of FIG. 1 and in data storage 22 of FIG. 2 as net-delay ML model configuration files 35. The cell-delay ML model configuration files include the architecture of the cell-delay ML model along with the parameters developed from the training of the cell-delay ML model and may be stored in cell-delay database 14 of FIG. 1 and in data storage 22 of FIG. 2 as cell-delay ML model configuration files 36.

A user design is received (103). In the embodiment shown in FIG. 2 user design input 21 is configured for receiving the user design which may be in the form of one or more data file defining an IC design that is to be formed on a device wafer (by fabricating a device or programming a programmable logic device). The received user design may be stored in data storage 22. Alternately, the user design may be created by a user using ML design flow tools 32 and the user design may be stored in data storage 22. In this example, the files of the user design are read from data storage 22 and received (103) at user-design feature extractor 31.

Feature values are extracted (104) from the user-design for each slew-rate feature, net-delay feature and cell-delay feature to obtain slew-rate feature values, net-delay feature values and cell-delay feature values of the user design. In the embodiment shown in FIG. 2 user-design feature extractor 31 is configured to receive the input user design, or the user design created using ML design flow tools 32, and extract slew-rate feature values, net-delay feature values, and cell-delay feature values from the user design. Alternatively, user-design feature extractor 31 is operable to extract feature values by providing instructions to ML design flow tools 32 such that, in response to receiving the instructions from user-design feature extractor 31, ML design flow tools 32 are operable to perform the extraction.

The slew-rate ML model configuration files are loaded (into RAM or a Neural Network Engine) to form a slew-rate inference core (105); operations of the slew-rate inference core are performed (106) using the extracted slew-rate feature values as input to calculate predicted slew-rate values for each signal in the user design; and the calculated predicted slew-rate values are optionally sent to the ML design flow tools (107). In one example, prediction ML module 33 is configured to load slew-rate ML model configuration files 34 into RAM 24 or neural network engine 30 to form a slew-rate inference core 37, perform operations of the slew-rate inference core 37 using the extracted slew-rate feature values as input to calculate predicted slew-rate values; and send the predicted slew-rate values to ML design flow tools 32.

Figure 4:
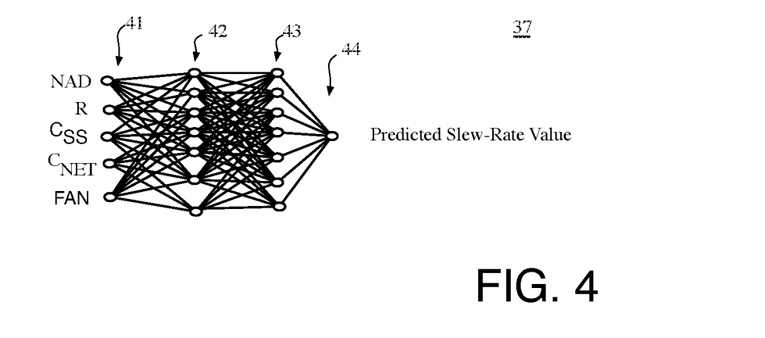
FIG. 4 is a diagram illustrating a slew-rate inference core in accordance with an aspect of the present invention.

FIG. 4 illustrates an exemplary inference core 37 that includes input neurons 41, rows of hidden neurons 42-43, and output neuron 44 that calculate a predicted slew-rate value. In this example, features (represented by input neurons 41) include the number of active devices (NAD) between the source and sink (in an FPGA, these may be multiplexers or simple switches), the total resistance (R) between the source and the sink and capacitance ($C_{SS}$) between the source and sink, the total capacitance ($C_{NET}$) and fanout (FAN) of the entire net generating the slew-rate on its output.

Returning to FIG. 2, the net-delay ML model configuration files are loaded (into RAM or a Neural Network Engine) to form a net-delay inference core (108); operations of the net-delay inference core are performed (109) using the extracted net-delay feature values as input to calculate predicted net-delay values for each net in the user design; and the calculated predicted net-delay values are optionally sent to the ML design flow tools (110). In one example, prediction ML module 33 is configured to load net-delay ML model configuration files 35 into RAM 24 or neural network engine 30 to form a net-delay inference core 38, perform operations of the net-delay inference core 38 using the extracted net-delay feature values as input to calculate predicted net-delay values; and send the calculated predicted net-delay values to ML design flow tools 32.

Figure 5:
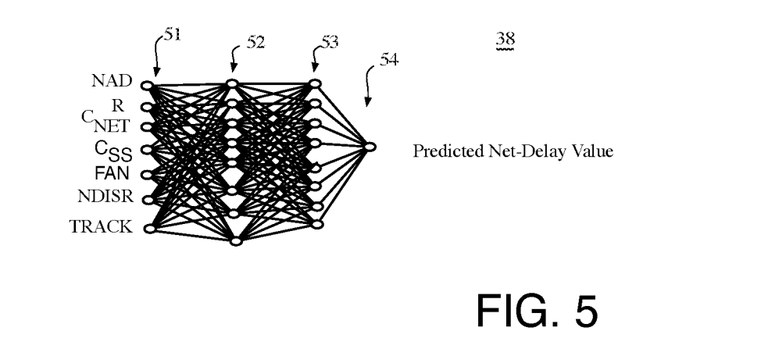
FIG. 5 is a diagram illustrating a net-delay inference core in accordance with an aspect of the present invention.

FIG. 5 illustrates an exemplary inference core 38 that includes input neurons 51, rows of hidden neurons 52-53, and output neuron 54 that generates a predicted net-delay value. In this example, features (represented by input neurons 51) include NAD, R, $C_{SS}$, $C_{NET}$, FAN, the input slew-rate on the input of the net driver (NDISR) and track types between the source and sink of the net (TRACK). In the example of a FPGA, the track types may be identified by buffer name which captures the combination of track buffer, track length, and multiplexers on the track. In ASICs, these characteristics may be explicitly listed individually in place of the track type. Tracks may be short, medium, or long lines with additional sub-types to capture tracks of different lengths.

Returning to FIG. 2, the cell-delay ML model configuration files are loaded (into RAM or a Neural Network Engine) to form a cell-delay inference core (111); operations of the cell-delay inference core are performed (112) using the extracted cell-delay feature values as input to calculate predicted cell-delay values for each cell in the user design; and the calculated cell-delay values are optionally sent to the ML design flow tools (113). In one example, prediction ML module 33 is configured to load cell-delay ML model configuration files 36 into RAM 24 or neural network engine 30 to form a cell-delay inference core 39, perform operations of the cell-delay inference core 39 using the extracted cell-delay feature values as input to calculate predicted cell-delay values; and send the predicted cell-delay values to ML design flow tools 32.

Figure 6:
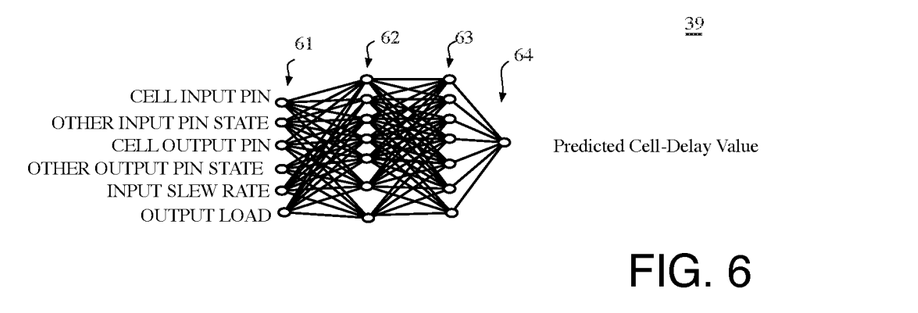
FIG. 6 is a diagram illustrating a cell-delay inference core in accordance with an aspect of the present invention.

FIG. 6 illustrates an exemplary cell-delay inference core 39 that includes input neurons 61, rows of hidden neurons 62-63, and output neuron 64 that generates a predicted cell-delay value. Cell-delay features include cell input pin (CELL INPUT PIN), the state of remaining inputs (OTHER INPUT PIN STATE) which may be the state of all inputs minus the one involved in the delay calculation, cell output pin (CELL OUTPUT PIN), the state of remaining outputs (OTHER OUTPUT PIN STATE), which is the state of all outputs minus the one involved in the delay calculation, the input slew-rate on the cell input (INPUT SLEW RATE) and the output load on the cell output (OUTPUT LOAD). The time delay from each cell input to a particular cell output is different, so the feature specifications include which of a plurality of inputs is being used, as well as which of a plurality of outputs (if more than one) is being used. In addition, the logic states of other inputs to the cell can affect the input-to-output timing delay and these are also specified as cell features.

In one embodiment step 104-113 of FIG. 3 are performed in response to receiving an instruction from ML design flow tools 32 (e.g., each time that a new user design is to be evaluated) and are performed in an automated manner by IC design system 20 without user intervention. In response to the instruction, prediction ML module 33 is operable to load the configuration files required for performing the instruction (slew-rate ML model configuration files 34, net-delay ML model configuration files 35 or cell-delay ML model configuration files 36) into RAM 24 or neural network engine 30 to form the slew-rate inference core 37, the net-delay inference core 38 or the cell-delay inference core 39, and to perform the required neural network operation. As the results of each operation are output by the respective inference core 37-39, the prediction ML module 33 is operable to couple the output to ML design flow tools 32 and send the results of each operation to ML design flow tools 32.

In one example, user-design feature extractor 31 is operable during the design activity by an end-user to send data and instructions to, and receive responses from, ML design flow tools 32, so as to extract feature values and exercise prediction ML module 33 using the ML design flow tools 32.

The user design is iterated (114) within the ML design flow tools 32 until a final user design is obtained that is free of timing violations. In one example ML design flow tools 32 iterate the user design (e.g., using one or more of a synthesis tool, placer tool, router tool, and static timing analyzer (STA) tool) and calculated predicted slew-rate values, predicted net-delay values and predicted cell-delay values until the user design of the target IC is free of timing violations to identify the final user design.

In one example, step 114 includes determining whether the user design has a timing violation; and if the design has a timing violation, one or more of the synthesis tool, placer tool, router tool and STA tool of design flow tools 32 is operable to iterate the design in an automated manner without user intervention to repeatedly change the design (e.g., by changing synthesis of one or more components, placement of one or more components, routing between components, and/or static timing of one or more components) and repeat steps 104-113 (exercising user-design feature extractor 31 and prediction ML module 33 as needed) until a final user design is obtained that is free of timing violations.

The method optionally includes programming (115) the final user design into a target FPGA IC device. In one example, device programmer 27 performs programming of the actual silicon to be used within the end-user product in embodiments of the invention where the final-user design is being realized in a user-programmable integrated circuit, such as an FPGA. FPGA device programmers are available from both FPGA manufacturers and numerous third-party vendors. To perform the programming one or more packaged FPGA devices are placed in device sockets and appropriate data and voltages are applied to the packaged devices to implement the design as actual circuits in the packaged FPGA device.

The method optionally includes generating a plurality of photomasks (116) corresponding to the final user design. In one example, mask generator 26 is operable to generate the photomasks. More particularly, optional mask generator 26 is a device that performs the actual generation of the geometric patterns for photolithographic masks that are used to fabricate actual silicon to be produced in embodiments of the invention where the design is being realized in a mask-defined integrated circuit. Integrated hardware systems are available from numerous vendors to convert design data into physical geometric patterns and transfer the patterns to, for example, chrome photolithographic masks.

Figure 7:
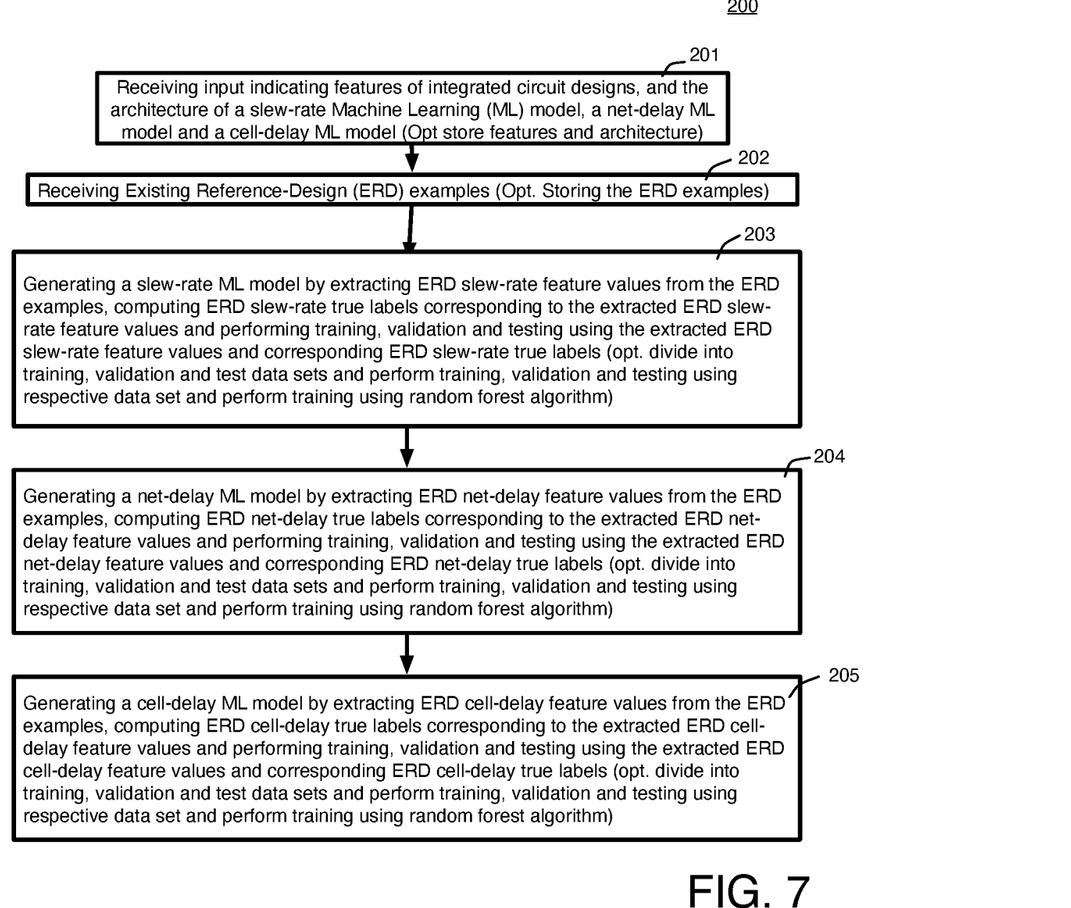
FIG. 7 is a flow diagram showing a method for generating ML models in accordance with an aspect of the present invention.

FIG. 7 illustrates an exemplary method (200) for performing step 101 of FIG. 3. Method 200 includes receiving input (201) indicating features of an IC design, and architectures of each of a slew-rate ML model, a net-delay ML model and a cell-delay ML model. In the embodiment shown in FIG. 1 feature input 2 is configured to receive the input indicating features (e.g., in the form of one or more electronic files), which may be stored in data storage 11 or be coupled directly to ERD feature extractor 4. The input indicating architecture of the slew-rate ML model, the net-delay ML model and the cell-delay ML model, may be received via I/O module 1, and may include parameters, hyperparameters, and so forth, and may be stored in data storage 11 or be coupled directly to training, validation and testing ML module 6.

ERD examples are received (202) as input. In the embodiment shown in FIG. 1 ERD example input 3 is configured to receive ERD examples (from known designs having valid timing) and either store the received ERD examples in data storage 11 or couple the received ERD examples directly to ERD feature extractor 4.

A slew-rate ML model is generated (203) by extracting ERD slew-rate feature values from the ERD examples, computing ERD slew-rate true labels corresponding to the extracted ERD slew-rate feature values, and performing training, validation and testing of the generated slew-rate ML model using the extracted ERD slew-rate feature values and corresponding ERD slew-rate true labels to generate slew-rate ML model. Optionally, as described further below, the extracted ERD slew-rate feature values, preferably in combination with slew-rate true values, are divided into training, validation and test data sets. Further optionally, the training, validation and testing of the generated slew-rate ML model is performed on the respective training, validation and test data set. In one embodiment, training, validation and testing of the generated slew-rate ML model is performed on the respective training, validation and test data set using a commercially available program, such as the TensorFlow software program mentioned above. Further optionally the training is performed using a random forest algorithm.

A net-delay ML model is generated (204) by extracting ERD net-delay feature values from the ERD examples, computing ERD net-delay true labels corresponding to the extracted ERD net-delay feature values, and performing training, validation and testing of the generated net-delay ML model using the extracted ERD net-delay feature values and corresponding ERD net-delay true labels to generate trained net-delay ML model. Optionally, as described further below, the extracted ERD net-delay feature values, preferably in combination with net-delay true values, are divided into training, validation and test data sets. Further optionally, the training, validation and testing of the generated net-delay ML model is performed on the respective training, validation and test data set using a commercially available software program, such as the TensorFlow software program mentioned above. Further optionally the training is performed using a random forest algorithm.

A cell-delay ML model is generated (205) by extracting ERD cell-delay feature values from the ERD examples, computing ERD cell-delay true labels corresponding to the extracted ERD cell-delay feature values, and performing training, validation and testing of the generated cell-delay ML model using the extracted ERD cell-delay feature values and corresponding ERD cell-delay true label to generate cell-delay ML model. Optionally, as described further below, the extracted ERD cell-delay feature values, preferably in combination with cell-delay true values, are divided into training, validation and test data sets using a commercially available software program, such as the TensorFlow software program mentioned above. Further optionally, the training, validation and testing of the generated cell-delay ML model is performed on the respective training, validation and test data set. Further optionally the training is performed using a random forest algorithm.

In one example the training of the slew-rate ML model, the training of the net-delay ML model and the training of the cell-delay ML model uses a random forest training algorithm applied through the software program (e.g. the TensorFlow program).

In one example, ERD feature extractor 4 receives the input indicating features, sends data and instructions to, and receive responses from, design flow tools 5, so as to build a deck (e.g., a SPICE deck) using the design flow tools 5 (e.g., a SPICE deck constructor), having values for the design features to be used by the particular ML model (e.g., the net tracks, buffers, and switches) and corresponding net topology (i.e., the manner in which the components are connected together). ERD feature extractor 4 is operable to read the received ERD examples and extract ERD feature values and builds an instance of slew-rate database 12 in which the extracted values for ERD slew-rate features (i.e. ERD slew-rate feature values) are stored, an instance of net-delay database 13 in which the extracted values for the ERD net-delay features (i.e. ERD net-delay feature values) are stored, and an instance of cell-delay database 14 in which the extracted values for ERD cell delay features (i.e. ERD cell-delay feature values) are stored. ERD feature extractor 4 is then operable to send data and instructions to, and receive responses from, design flow tools 5, which design flow tools 5 are then operable to run a SPICE simulation or other circuit simulator program and computes ERD true labels for each slew-rate (slew-rate true labels), each net delay (net-delay true labels) and each cell delay (cell-delay true labels) in the ERD examples. Design flow tools 5 stores the computed ERD true labels (e.g. by concatenating each computed true label to the corresponding feature values that were used to generate the true label to form a data record and storing slew-rate data records in the respective instance of slew-rate database 12, storing net-delay data records in the respective instance of net-delay database 13 and storing cell-delay data records in the respective instance of cell-delay database 14.

Training validation and testing ML module 6 divides the slew-rate data records (that include the computed ERD slew-rate true labels and extracted ERD slew-rate feature values) to create a slew-rate training data set, a slew-rate validation data set and a slew-rate test data set and stores the slew-rate training data set, slew-rate validation data set and slew-rate test data set in the respective instance of slew-rate database 12; divides the net-delay data records (that include the computed ERD net-delay true labels and extracted ERD net-delay feature values) to create a net-delay training data set, a net-delay validation data set and a net-delay test data set and stores the net-delay training data set, net-delay validation data set and net-delay test data set in the respective instance of net-delay database 13; and divides the cell-delay data records (that include the computed ERD cell-delay true labels and extracted ERD cell-delay feature values) to create a cell-delay training data set, a cell-delay validation data set and a cell-delay test data set and stores the cell-delay training data set, cell-delay validation data set and cell-delay test data set in the respective instance of cell-delay database 14. In one example, a data matrix containing the data records is read into a data frame for processing and is randomly split with 20% going into a training data set, 20% going into a validation data set and the remainder going into a test data set.

Training validation and testing ML module 6 generates a slew-rate ML model using the received features and architecture of the slew-rate ML model, trains the slew-rate ML model using the training data set and stores configuration files of the trained ML model (slew-rate ML model configuration files) in the respective instance of slew-rate database 12; generates a net-delay ML model using the received features and architecture of the net-delay ML model, trains the net-delay ML model using the net-delay training data set and stores configuration files of the trained ML model (net-delay ML model configuration files) in the respective instance of net-delay database 13; and generates a cell-delay ML model using the received features and architecture of the cell-delay ML model, trains the cell-delay ML model using the cell-delay training data set and stores configuration files of the trained cell-delay ML model (cell-delay ML model configuration files) in the respective instance of cell-delay database 14. During the training, various configuration parameter sets (also known as hyperparameters) are evaluated and the hyperparameter set providing the best balance of training time and ML model accuracy is selected for training the net-delay ML model, cell-delay ML model and slew-rate ML model.

Training validation and testing ML module 6 validates the trained slew-rate ML model using the slew-rate validation data set, validates the trained net-delay ML model using the net-delay validation data set and validates the trained cell-delay ML model using the cell-delay validation data set.

Figure 8:
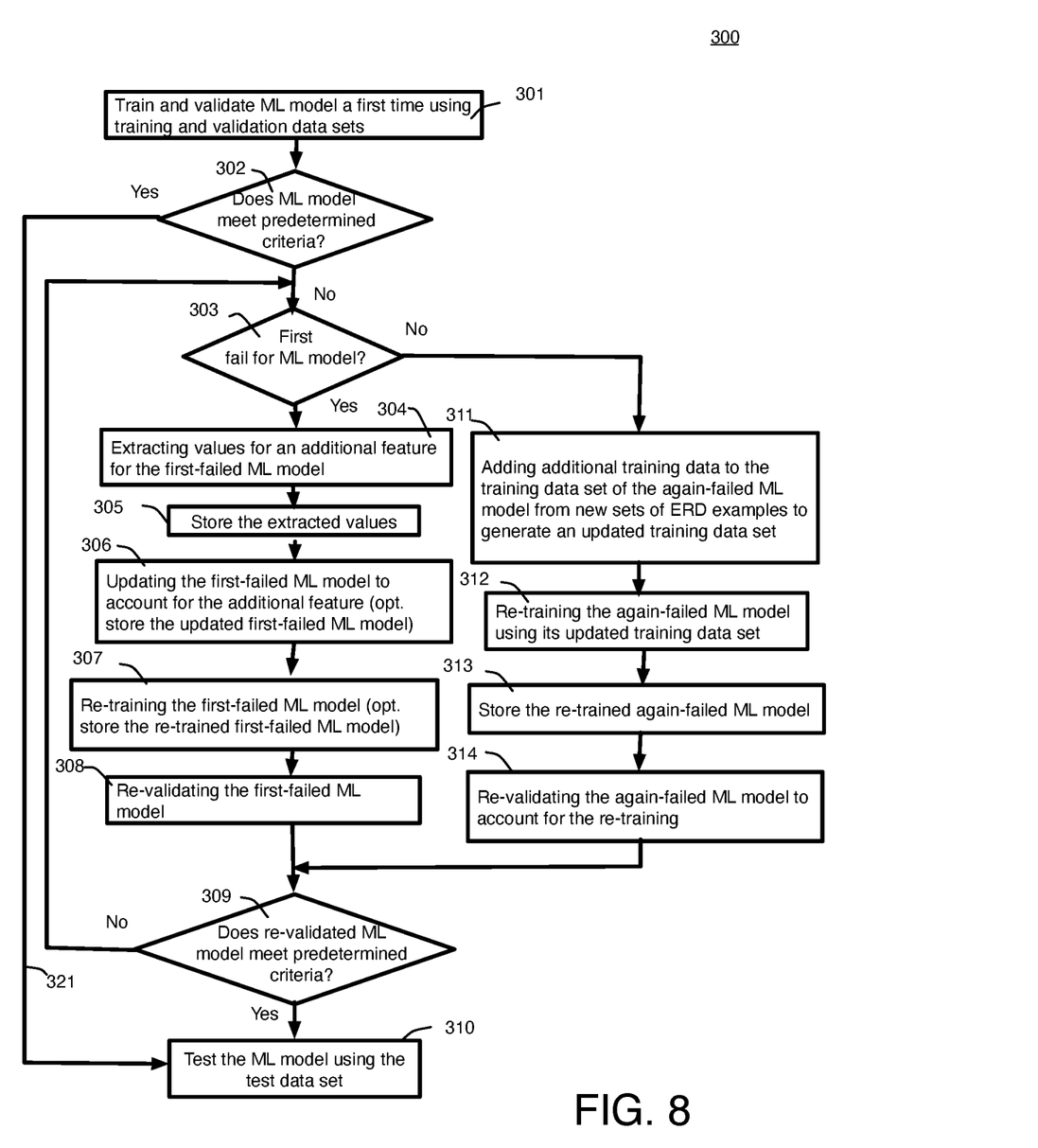
FIG. 8 is a flow diagram showing a method for performing validation and testing of a ML model in accordance with an aspect of the present invention.

FIG. 8 illustrates an exemplary training, validation and testing process (300) that includes performing training and validating the ML model a first time (301) to identify a first-time-validated ML model (a first-time validated slew-rate ML model, a first-time validated net-delay ML model or a first-time validated cell-delay ML model). In one example the first-time validation of the trained ML model includes a feature-dropping sensitivity analysis and removal of unnecessary features from the first-time validated ML model to avoid overfitting (in which case the first-time validated ML model may not be able to accurately filter out noise in the data), the feature-dropping sensitivity analysis keeping enough features (slew-rate features, net-delay features and cell-delay features, respectively) so that the first-time validated ML model does not degrade beyond a minimum value of accuracy.

Method 300 includes determining if the first-time-validated ML model meets predetermined criteria (302). In one example the predetermined criterion is an error measurement. In this embodiment the error in each ML model is determined using a Root Mean Square Error (RMSE) or R-Square analysis on the test data set. The determined error is compared to a stored error threshold (e.g., stored in data storage 11). If the error is more than the threshold the ML model fails the validation. In one example the error threshold is chosen to be approximately the same as the error between the design flow tools 5 and silicon measurements of an IC device formed using the design flow tools 5, which may be, for example, 5%. In an exemplary embodiment steps 301-302 are performed by training, validation and testing ML module 6 of ML model generating system 10.

If the first-time-validated ML model meets the predetermined criteria, following line 321, the validation process ends and training, validation and testing ML module 6 proceeds to testing (310) of the first-time-validated ML model.

Training validation and testing ML module 6 is operable for determining (303) whether the failed ML model has failed for a first time (303). If the failed ML model has failed for a first time, values for an additional feature for first-failed ML model are extracted (304) (e.g., training validation and testing ML module 6 instructs ERD feature extractor 4 and/or design flow tools 5 to perform the extraction) and are stored (305). Training, validation and testing ML module 6 updates (306) the first-failed ML model to account for the additional feature and optionally stores the updated first-failed ML model in data storage 11. Training validation and testing ML module 6 then re-trains the first-failed ML model (307) and re-validates (308) the re-trained, updated first-failed ML model and stores the re-validated first-failed ML model in data storage 11. If the re-validated first-failed ML model does not meet the predetermined criteria (309) the process proceeds back to step 303. If the re-validated first-failed ML model does meet the predetermined criteria (309) the validation process ends and the process proceeds to testing of the ML model (310).

If the ML model has failed more than once (303), training validation and testing ML module 6 adds (311) additional training data to the training data set of the again-failed ML model from new sets of ERD examples to generate an updated training data set and optionally stores the updated training data set. Training, validation and testing ML module 6 re-trains (312) the again-failed ML model using the updated training data set, stores (313) the re-trained again-failed ML model; and re-validates (314) the again-failed ML model and optionally stores the re-validated again-failed ML model. If the re-validated again-failed ML model does not meet the predetermined criteria (309) the process of steps 303 and 311-314 is repeated (i.e., additional training data is added at each pass through reference numeral 311) until the predetermined criteria are met in step 309. If the re-validated again-failed ML model meets the predetermined criteria (309) the validation process ends and training, validation and testing ML module 6 proceeds to testing (310) of the re-validated again-failed ML model.

Training validation and testing ML module 6 tests (310) the trained and validated slew-rate ML model using the slew-rate test data set, tests the trained and validated net-delay ML model using the net-delay test data set and tests the trained and validated cell-delay ML model using the cell-delay test data set. In one example, the testing identifies a predetermined rating for each ML model, and each ML model is tested to identify a rating for the particular ML model. The ML model is only used if the rating for the particular ML model meets the predetermined rating.

When the validation and optionally the testing of a ML model result in the generation of a new ML model, the new ML model is stored (e.g., by overwriting the configuration files for the particular ML model) such that configuration files for the final slew-rate ML model are stored in an instance of slew-rate database 12; the configuration files for the final net-delay ML model is stored in an instance of net-delay database 13; and the configuration files for the final cell-delay ML model is stored in an instance of cell-delay database 14.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for integrated circuit design with delay verification comprising:
    storing configuration files of a slew-rate Machine Learning (ML) model, a net-delay ML model and a cell-delay ML model;
    receiving a user design;
    extracting feature values from the user design for each slew-rate feature, net-delay feature and cell-delay feature to obtain slew-rate feature values, net-delay feature values and cell-delay feature values;
    loading the slew-rate ML model configuration files to form a slew-rate inference core;
    performing operations of the slew-rate inference core using the extracted slew-rate feature values as input to calculate predicted slew-rate values;
    loading the net-delay ML model configuration files to form a net-delay inference core;
    performing operations of the net-delay inference core using the extracted net-delay feature values as input to calculate predicted net-delay values;
    loading the cell-delay ML model configuration files to form a cell-delay inference core;
    performing operations of the cell-delay inference core using the extracted cell-delay feature values as input to calculate predicted cell-delay values; and
    iterating the user design by an ML design flow tools responsive to the predicted slew-rate values, the predicted net-delay values and the predicted cell-delay values until a final user design is obtained that is free of timing violations.

2. The method of claim 1 wherein the loading slew-rate ML model configuration files of the slew-rate ML model to form the slew-rate inference core further comprises loading the slew-rate ML model configuration files into a neural network engine, the neural network engine operable for performing operations of the slew-rate inference core using the obtained slew-rate feature values as input to calculate the predicted slew-rate values.

3. The method of claim 1 further comprising programming the final user design into a target field programmable gate array integrated circuit device.

4. The method of claim 1 further comprising generating a plurality of photomasks corresponding to the final user design.

5. The method of claim 1 further comprising:
    sending the predicted slew-rate values to the ML design flow tools;
    sending the predicted net-delay values to the ML design flow tools; and
    sending the predicted cell-delay values to the ML design flow tools.

6. The method of claim 1 further comprising:
    generating the slew-rate ML model, the net-delay ML model and the cell-delay ML model.

7. The method of claim 6 further comprising:
    receiving input indicating features of integrated circuit designs and the architecture of the slew-rate ML model, the net-delay ML model and the cell-delay ML model; and
    receiving Existing Reference-Design (ERD) examples, wherein:
    generating the slew-rate ML model comprises extracting ERD slew-rate feature values from the ERD examples, computing ERD slew-rate true labels corresponding to the extracted ERD slew-rate feature values and performing training, validation and testing of the generated slew-rate ML model using the extracted ERD slew-rate feature values and corresponding ERD slew-rate true labels;
    generating the net-delay ML model comprises extracting ERD net-delay feature values from the ERD examples, computing ERD net-delay true labels corresponding to the extracted ERD net-delay feature values, and performing training, validation and testing of the generated net-delay ML model using the extracted ERD net-delay feature values and corresponding ERD net-delay true labels; and
    generating the cell-delay ML model comprises extracting ERD cell-delay feature values from the ERD examples, computing ERD cell-delay labels corresponding to the extracted ERD cell-delay feature values and performing training, validation and testing of the generated cell-delay ML model using the extracted ERD cell-delay feature values and corresponding ERD cell-delay labels.

8. The method of claim 7 wherein the validation of the slew-rate ML model, the net-delay ML model and the cell cell-delay ML model further comprises:
    performing a first validation to identify a first-time-validated ML model;
    determining if the first-time-validated ML model meets predetermined criteria;
    if the first-time-validated ML model meets the predetermined criteria, proceeding to test the first-time-validated ML model; and
    identifying each first-time-validated ML model that fails to meet the predetermined criteria as a failed ML model and modifying the failed ML model so that it meets the predetermined criteria.

9. The method of claim 8 wherein the modifying the failed ML model further comprises:
    determining whether the failed ML model has failed for a first time;
    if the failed ML model has failed for a first time, extracting values for an additional feature for the first-failed ML model, updating the first-failed ML model to account for the additional feature, re-training the first-failed ML model and re-validating the first-failed ML model; and
    if the ML model has failed more than once, adding additional training data to the training data set of the failed ML model from new sets of ERD examples to generate an updated training data set, re-training the failed ML model using its updated training data set, and re-validating the failed ML model.

10. An integrated circuit design system with delay verification using an interference core, comprising:

a data storage to store configuration files for a slew-rate Machine Learning (ML) model, a net-delay ML model and a cell-delay ML model;

a user-design feature extractor coupled to the data storage, the user-design feature extractor to extract slew-rate feature values, net-delay feature values, and cell-delay feature values from a user design;

ML design flow tools coupled to the user-design feature extractor and to the data storage; and a prediction ML module coupled to the data storage, the user-design feature extractor, and the ML design flow tools, the prediction ML module configured to:

load the slew-rate ML model configuration files to form a slew-rate inference core, load the net-delay ML model configuration files to form a net-delay inference core and load the cell-delay ML model configuration files to form a cell-delay inference core, perform operations of the slew-rate inference core using the extracted slew-rate feature values as input to calculate predicted slew-rate values, perform operations of the net-delay inference core using the extracted net-delay feature values as input to calculate predicted net-delay values and perform operations of the cell-delay inference core using the extracted cell-delay feature values as input to calculate predicted cell-delay values, and send the predicted slew-rate values, the predicted net-delay values and the predicted cell-delay values to the ML design flow tools, wherein the ML design flow tools are configured to iterate the user design responsive to the predicted slew-rate values, the predicted net-delay values and predicted cell-delay values until the user design is free of timing violations to identify a final user design.

11. The integrated circuit design system with delay verification using an interference core of claim 10 further comprising:

One or more input to receive input indicating features of integrated circuit designs, to receive the architecture of the slew-rate ML model, the net-delay ML model and the cell-delay ML model, and to receive existing reference-design (ERD) examples;

an ERD feature extractor coupled to the input, the ERD feature extractor configured to extract ERD feature values from the received ERD examples to obtain ERD slew-rate feature values, ERD net-delay feature values and ERD cell-delay feature values;

design flow tools coupled to the ERD feature extractor, the design flow tools to compute ERD slew-rate true labels corresponding to the extracted ERD slew-rate feature values, compute ERD net-delay true labels corresponding to the extracted ERD net-delay feature values and compute ERD cell-delay true labels corresponding to the extracted ERD cell-delay feature values;

a training, validation and testing ML module configured to:

generate a slew-rate ML model and perform training, validation and testing using the extracted ERD slew-rate feature values and corresponding ERD slew-rate true labels;

generate a net-delay ML model and perform training, validation and testing using the extracted ERD net-delay feature values and corresponding ERD net-delay true labels; and generate a cell-delay ML model and perform training, validation and testing using the extracted ERD cell-delay feature values and corresponding ERD cell-delay true labels.

12. The integrated circuit design system with delay verification using an interference core of claim 10 further comprising at least one of a device programmer or a mask generator coupled to the ML design flow tools.

13. A method for integrated circuit design with delay verification comprising:

receiving input indicating features of integrated circuit designs and an architecture of a slew-rate Machine Learning (ML) model, a net-delay ML model and a cell-delay ML model;

receiving Existing Reference-Design (ERD) examples;

generating the slew-rate ML model by extracting ERD slew-rate feature values from the ERD examples, computing ERD slew-rate true labels corresponding to the extracted ERD slew-rate feature values, and performing training, validation and testing of the generated slew-rate ML model using the extracted ERD slew-rate feature values and corresponding ERD slew-rate true labels;

generating the net-delay ML model by extracting ERD net-delay feature values from the ERD examples, computing ERD net-delay true labels corresponding to the extracted ERD net-delay feature values, and performing training, validation and testing of the generated net-delay ML model using the extracted ERD net-delay feature values and corresponding ERD net-delay true labels;

generating the cell-delay ML model by extracting ERD cell-delay feature values from the ERD examples, computing ERD cell-delay labels corresponding to the extracted ERD cell-delay feature values, and performing training, validation and testing of the generated cell-delay ML model using the extracted ERD cell-delay feature values and corresponding ERD cell-delay labels;

storing configuration files for the generated slew-rate ML model, the net-delay ML model and the cell-delay ML model;

receiving a user design;

extracting values from the user design for each slew-rate feature, net-delay feature and cell-delay feature to obtain slew-rate feature values, net-delay feature values and cell-delay feature values;

loading the slew-rate ML model configuration files to form a slew-rate inference core;

performing operations of the slew-rate inference core using the extracted slew-rate feature values as input to calculate predicted slew-rate values;

loading the net-delay ML model configuration files to form a net-delay inference core;

performing operations of the net-delay inference core using the extracted net-delay feature values as input to calculate predicted net-delay values;

loading the cell-delay ML model configuration files to form a cell-delay inference core;

performing operations of the cell-delay inference core using the extracted cell-delay feature values as input to calculate predicted cell-delay values; and iterating the user design responsive to the predicted slew-rate values, net-delay values and cell-delay values until a final user design is obtained that is free of timing violations.

14. The method of claim 13 wherein the training uses a random forest training algorithm.

15. The method of claim 13 further comprising:
dividing the extracted ERD slew-rate feature values and corresponding computed ERD slew-rate true labels into a slew-rate training data set, a slew-rate validation data set and a slew-rate test data set;
training the generated slew-rate ML model using the slew-rate training data set;
validating the generated slew-rate ML model using the slew-rate validation data set;
testing the generated slew-rate ML model using the slew-rate test data set; and
sending the predicted slew-rate values to design flow tools.

16. The method of claim 15 further comprising:
dividing the extracted ERD net-delay feature values and corresponding ERD net-delay true labels into a net-delay training data set, a net-delay validation data set and a net-delay test data set;
training the net-delay ML model using the net-delay training data set;
validating the net-delay ML model using the net-delay validation data set;
testing the net-delay ML model using the net-delay test data set; and
sending the predicted net-delay values to design flow tools.

17. The method of claim 16 further comprising:
dividing the extracted ERD cell-delay feature values and corresponding ERD cell-delay true labels into a cell-delay training data set, a cell-delay validation data set and a cell-delay test data set;
training the cell-delay ML model using the cell-delay training data set;
validating the cell-delay ML model using the cell-delay validation data set;
testing the cell-delay ML model using the cell-delay test data set; and
sending the predicted cell-delay values to design flow tools.

\* \* \* \* \*

UNITED STATES PATENT AND TRADEMARK OFFICE
CERTIFICATE OF CORRECTION

PATENT NO. : 11,341,304 B2
APPLICATION NO. : 17/111218
DATED : May 24, 2022
INVENTOR(S) : Madhusudan Raman Page 1 of 1

It is certified that error appears in the above-identified patent and that said Letters Patent is hereby corrected as shown below:

In the Claims

In Claim 10, Column 15, Line 12 delete "configured",

In Claim 10, Column 15, Line 31 delete "are configured".

In Claim 11, Column 15, Line 46 and Line 58, delete "configured".

Signed and Sealed this
Thirtieth Day of August, 2022

Katherine Kelly Vidal
*Director of the United States Patent and Trademark Office*